(12) United States Patent
Choudhury et al.

(10) Patent No.: US 7,177,324 B1
(45) Date of Patent: Feb. 13, 2007

(54) NETWORK HAVING BANDWIDTH SHARING

(75) Inventors: Gagan Lal Choudhury, Marlboro, NJ (US); Arunabha Guha, Lakewood, NJ (US); Wai Sum Lai, Holmdel, NJ (US); William G. Lester, Cranford, NJ (US); Moshe Segal, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 922 days.

(21) Appl. No.: 10/003,636

(22) Filed: Nov. 2, 2001

Related U.S. Application Data

(60) Provisional application No. 60/304,985, filed on Jul. 12, 2001.

(51) Int. Cl.
- *H04J 3/16* (2006.01)
- *H04J 1/02* (2006.01)
- *H04L 12/56* (2006.01)

(52) U.S. Cl. .................. 370/468; 370/395.41; 370/493

(58) Field of Classification Search ............. 370/395.4, 370/395.41, 468, 477, 493, 395.52, 494, 370/495; 725/111; 375/257
See application file for complete search history.

(56) References Cited

U.S. PATENT DOCUMENTS

| | | | |
|---|---|---|---|
| 5,778,174 A | 7/1998 | Cain | |
| 6,055,236 A | 4/2000 | Nessett et al. | |
| 6,230,326 B1 | 5/2001 | Unger et al. | |
| 6,529,520 B1 * | 3/2003 | Lee et al. | 370/442 |
| 6,650,624 B1 | 11/2003 | Quigley | |
| 6,742,187 B1 * | 5/2004 | Vogel | 725/126 |
| 6,763,032 B1 * | 7/2004 | Rabenko et al. | 370/442 |
| 6,804,251 B1 | 10/2004 | Limb | |
| 6,807,193 B1 * | 10/2004 | Beser | 370/498 |
| 6,807,195 B1 * | 10/2004 | Moore et al. | 370/503 |
| 2002/0093912 A1 | 7/2002 | Gummalla | |
| 2002/0101826 A1 * | 8/2002 | Giacopelli et al. | 370/252 |
| 2002/0154620 A1 | 10/2002 | Azenkot | |
| 2002/0159513 A1 * | 10/2002 | Williams et al. | 375/222 |
| 2003/0007508 A1 | 1/2003 | Sala | |
| 2004/0218589 A1 * | 11/2004 | Hebsgaard et al. | 370/352 |

OTHER PUBLICATIONS

Walter S. Ciciora; "The Cable Modem"; Consumer; IEEE Spectrum; Jun. 2001; pp. 48-53.
"Data-Over-Cable Service Interface Specifications Radio Frequency Interface Specification" Nov. 5, 1999, 382 pages, v1.1, Rev. 3, Cable Television Laboratories, Inc.

* cited by examiner

*Primary Examiner*—Ricky Q. Ngo
*Assistant Examiner*—Feben Micael Haile
(74) *Attorney, Agent, or Firm*—Michael Haynes, PLC; Michael N. Haynes; Dale R. Jensen

(57) ABSTRACT

A communication system includes a plurality of devices, such as cable modems, in communication with a station, such as a cable modem termination system, that provides efficient upstream bandwidth sharing.

18 Claims, 5 Drawing Sheets

US 7,177,324 B1

NETWORK HAVING BANDWIDTH SHARING

CROSS REFERENCE TO RELATED APPLICATIONS

This application claims the benefit of U.S. Provisional Patent Application No. 60/304,985, filed on Jul. 12, 2001.

STATEMENT REGARDING FEDERALLY SPONSORED RESEARCH

Not Applicable.

FIELD OF THE INVENTION

The present invention relates generally to communication systems and, more particularly, to communication systems sharing channel bandwidth.

BACKGROUND OF THE INVENTION

As is known in the art, there are a variety of known protocols for transferring voice, data, and signaling traffic using Internet Protocol (IP) packet switching technology over the Hybrid Fiber-Coax (HFC) infrastructure, which has traditionally been used for television broadcast. One such protocol is defined by the Data Over Cable Service Interface Specification (DOCSIS). However, in DOCSIS systems, the (HFC) upstream bandwidth is a potential bottleneck due to the relatively limited availability of bandwidth and the potential high demand for residential telephony and high-speed data applications.

It would, therefore, be desirable to provide a system having efficient schemes for managing the limited upstream bandwidth so that the blocking and delay requirements of voice and signaling traffic and the delay and throughput requirements of data traffic can be satisfied.

SUMMARY OF THE INVENTION

The present invention provides a network having enhanced sharing of a limited bandwidth channel, such as an upstream channel, among a plurality of users of the network, e.g., a cable network. In one embodiment, sub intervals within a map interval for specifying future upstream transmissions are optimized for efficient bandwidth utilization.

In one particular embodiment, a map interval for an upstream Data Over Cable Interface Specification (DOCSIS) network channel includes a management interval, a request interval, a data-plus-signaling interval, and a voice interval. So-called Unsolicited Grants (UGs) are used within the voice interval to transmit packetized voice streams. There is one UG per voice stream established at the beginning of a voice call and released as the call ends. The system arranges the different intervals and UG placement to minimize data packet fragmentation for optimal utilization of the limited upstream bandwidth.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
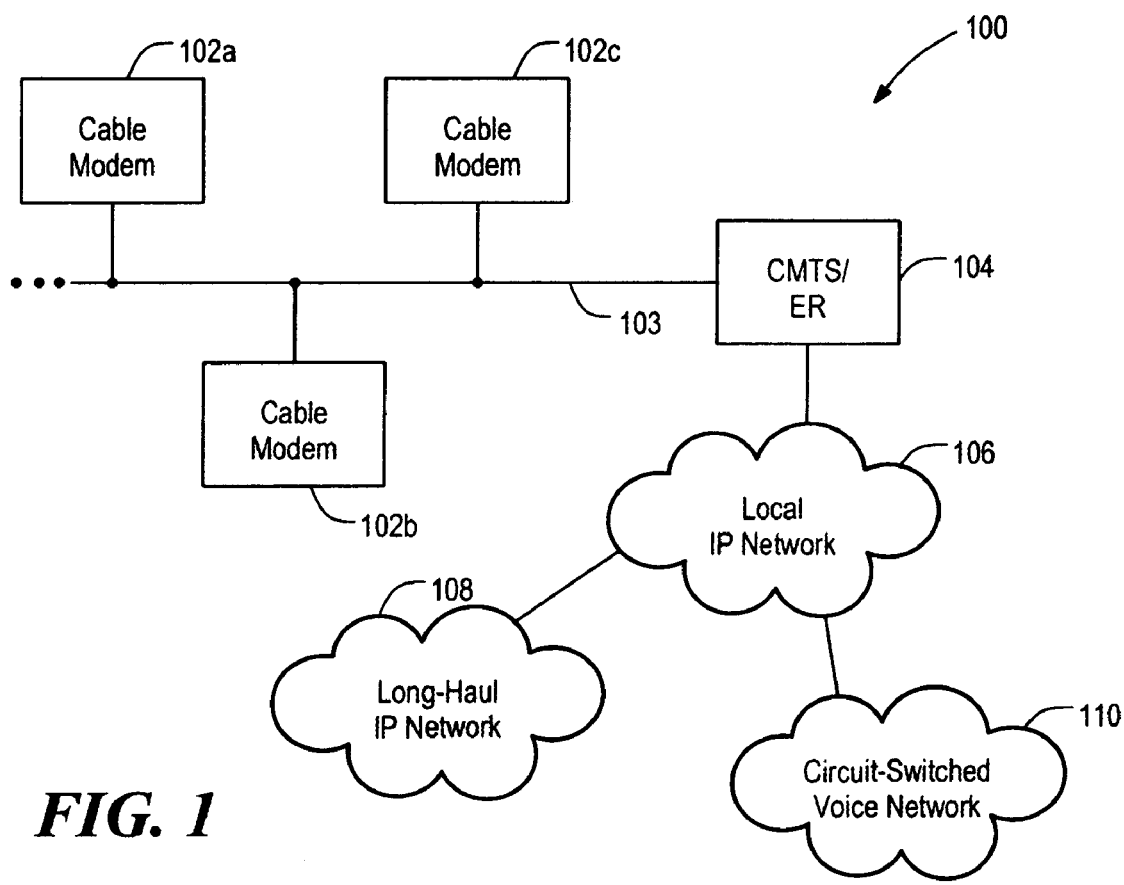
FIG. 1 is a schematic block diagram of a cable network having bandwidth sharing in accordance with the present invention.

FIG. 1 shows an exemplary network 100 having bandwidth sharing in accordance with the present invention. The network 100 includes a plurality of cable modems 102a,b,c, which can be located within respective households, each typically supporting several voice lines and one data port. The cable modems 102 transmit and receive voice and data as Internet Protocol (IP) packets, typically by carrying Real-time Transport ProtocoVUser Datagram Protocol (RTP/UDP) payload for voice and Transmission Control Protocol (TCP) or UDP payload for data, via a Hybrid-Fiber-Coax (HFC) plant 103 to a Cable Modem Termination System (CMTS) 104. The CMTS includes an edge router (ER) for transporting voice and data packets to a local IP network 106. From the local IP network 106, data packets typically travel to a long-haul IP network 108 and voice packets travel either to a circuit switched voice network 110 or to the IP network 108.

At each cable modem 102, separate traffic streams are supported using separate Service Flow IDs (SIDs). Packet queuing and contention for upstream transmission over the HFC are done independently for each SID. For each upstream channel, the transmission format and timing is controlled by periodic maps sent on the downstream.

Figure 2:
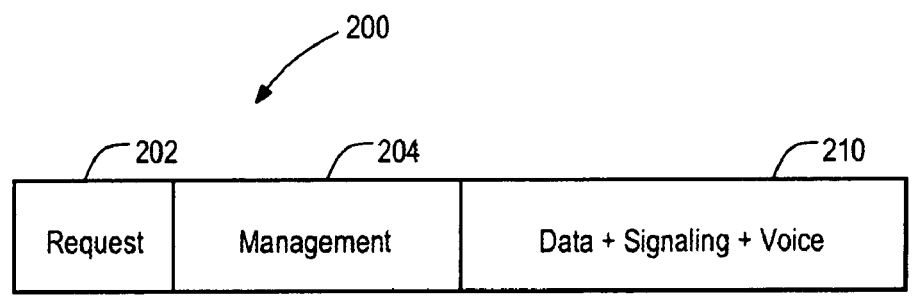
FIG. 2 is a schematic depiction of an exemplary map interval that can be used to control data transmission over the cable upstream of the network of FIG. 1.

FIG. 2 shows an exemplary format for a map interval 200. Each map specifies the transmission format for a time interval in future. As specified by DOCSIS, a map interval 200 includes a request interval 202, a management interval 204, and an interval 210 for sending data, signaling and voice traffic. The voice traffic is sent using unsolicited grants UGs (e.g., one UG per voice stream).

Figure 2A:
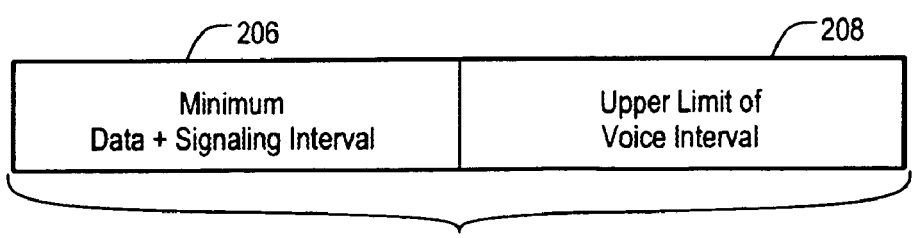
FIG. 2A is a schematic depiction of a further subdivision of a portion of the exemplary map interval of FIG. 2 into a data+signaling interval and a voice interval.

FIG. 2A shows an exemplary embodiment in which the data+signaling+voice interval 210 is further subdivided into a minimum data+signaling interval 206 and an upper limit of voice interval 208. The partition between the intervals is soft in the data+signaling to voice direction and hard in the voice to data+signaling direction. That is, the data+signaling interval 206 can use unused bandwidth in the voice interval 208 (with lower priority) but voice cannot use unused bandwidth in the data+signaling interval 206. The total data+signaling interval is the sum of the minimum data+signaling interval 206 and that part of the voice interval 208 that is not being used by voice UGs. This second part of the data+signaling interval fluctuates with time and depends on the number of voice streams present at a given time.

In order to control delay jitter for voice packets, unsolicited grants are used to provide transmission permission to a voice packet stream (identified by a SID) once every packetization interval. It is understood that real-time applications with relatively tight delay jitter requirements can be generally referred to as "voice," while applications not having tight delay jitter requirements can be referred to as "data." There can be multiple types of voice calls using various conventional encoding schemes (e.g., G.711, G.726, G.728 and G.729E). Also, the packetization interval and the degree of payload header suppression may vary among calls so that the unsolicited grants may be of variable size. As known to one of ordinary skill in the art, payload header suppression (PHS) refers to the removal of a repetitive or redundant portion of packet headers being transmitted between CM and CMTS on established voice sessions. The packetization interval (the time duration of speech sample carried by a single voice packet with at least one voice packet transmission per packetization interval), map interval 200, request interval 202, management interval 204 and the packet transmission times for voice, data and signaling can be integer multiples of a mini-slot, which is the basic time unit for transmission over the HFC upstream. A mini-slot typically is eight or sixteen bytes in length.

As an example, consider a 1.6 MHz upstream channel (with a symbol rate of 1.28 Million symbols per second) using QPSK modulation that corresponds to a channel bandwidth of 2.56 Mbps. Assuming a voice packetization interval of 10 ms and a map interval 200 the same as the packetization interval, then one map interval 200 shown above in FIGS. 2 and 2A has 3200 bytes, which is shared among the four interval types 202, 204, 206, 208. It is understood that the length of a map interval 200 can vary from map to map.

In one aspect of the invention, the upstream channel partition among the request 202, management 204, voice 208 and data+signaling intervals 206 is "soft" and flexible. It is understood that the downstream has only one transmitter, i.e., the CMTS 104 (FIG. 1), so that a variety of standard Quality of Service (QoS) mechanisms, e.g., strict priority, weighted fair queuing, weighted round robin, etc., can be used for efficient sharing among voice and data. However, upstream channel partitioning is more complicated due to the presence of many transmitters, e.g., cable modems 102 (FIG. 1).

In one embodiment, the system allows the minimum data+signaling interval 206 of the map interval 200 to utilize unused bandwidth in the voice interval 208 but with lower priority, i.e., the bandwidth is given up as soon as a new voice call arrives. As described above, UGs are located in the interval 208 and each UG transmits a single packetized voice stream identified by a unique SID. The part of the interval 208 not being used by the voice UGs forms the extension of the data+signaling interval 206. As the number of voice streams dynamically changes, the number of UGs required to support them changes and therefore the extension of the data/signaling interval vary as well. The system has a soft partition in the data+signaling-to-voice direction but a hard partition in the voice-to-data+signaling direction.

Figure 3:
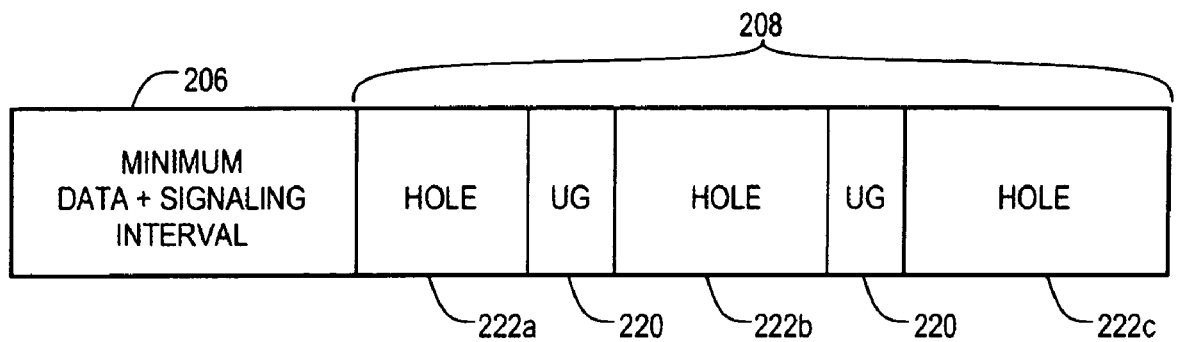
FIG. 3 is a schematic depiction of an exemplary random UG packing scheme within a map interval in accordance with the present invention.

As shown in FIG. 3, once the upper limit of the voice interval 208 is defined, the system determines how to pack the voice unsolicited grants (UGs) 220 in the voice region. In one embodiment, the voice UGs 220 are randomly packed within the voice region 208. This "pack random" scheme generates a plurality of holes 222 between the UGs 220. It is understood that the Figures are not drawn to scale so as to facilitate an understanding of the invention. The interval 206 plus the holes form the data+signaling interval. The non-contiguous nature of the holes increases the fragmentation of the data+signaling interval. The combination of the left-most hole 222a and the interval 206 can form a relatively large piece of the data+signaling interval and allows efficient data+signaling packet transmission. However, the other holes 222b and 222c can be relatively small and are inefficient for data+signaling packet transmission. The inefficiency is due to either an inability to transmit a large packet (if the "fragmentation" feature of DOCSIS 1.1 is not implemented) or to the additional overhead associated with fragmenting a large packet into a plurality of smaller packets (if the "fragmentation" feature is implemented).

Figure 4:
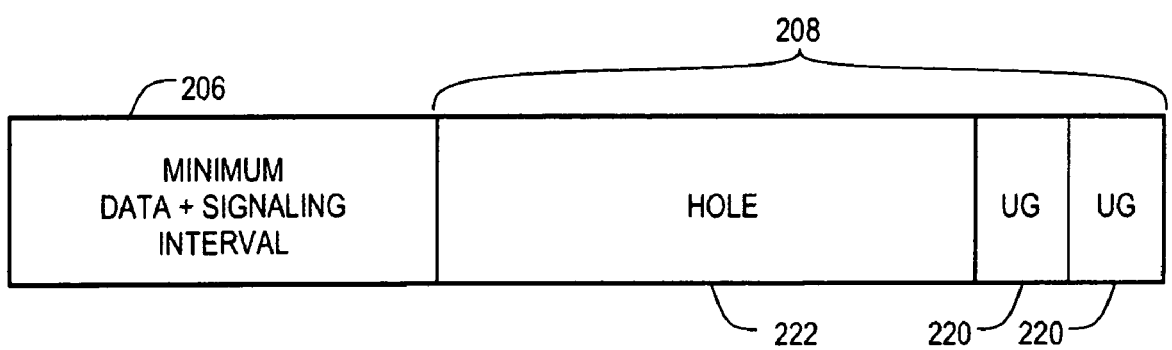
FIG. 4 is a schematic depiction of a further exemplary contiguous and away from data UG packing scheme within a map interval in accordance with the present invention.

In a further embodiment shown in FIG. 4, the UGs 220 are packed away from the minimum data+signaling interval 206 in order to form a single large hole 222 adjoining the interval 206. The data+signaling interval includes a single contiguous interval consisting of the interval 206 and the single adjoining hole 222. This single contiguous data+signaling interval is efficient for packet transmission since it does not have the inefficiencies of multiple small holes like the random UG packing scheme of FIG. 3. When a new voice call arrives, it is given an UG adjacent to the existing UGs so that the UGs stay packed away from the minimum data+signaling interval 206. In the case where a voice call termination leaves a hole among the UGs, the hole is closed by moving one or more UGs away from the minimum data+signaling interval 206. Closing of holes can introduce some jitter for voice packets. However, since voice packets are relatively small in size, the introduced jitter is relatively small compared to the delay jitter tolerance.

In another embodiment, UGs are packed away from data without closing of holes. This is the same as the case described in the previous paragraph except that if a voice-call termination leaves a hole among the UGs, then no attempt is made to close it immediately. However, as a new voice call arrives, the hole is attempted to be closed by placing the new UG at the hole. If the UGs are of the same size, this should always be possible. If they are of different sizes and the new UG is bigger than the hole then it is placed adjacent to the existing UGs. In terms of closing the hole, the system waits for a future voice call with the correct-sized UG to arrive. If the new UG is smaller than the hole then the system can either partially fill the hole or place it adjacent to the existing UGs and in terms of closing the hole, wait for a future voice call with the correct-sized UG to arrive. This scheme avoids the delay jitter of the scheme described in the previous paragraph. During the period of time during which the hole exists, it remains inefficient for transmitting large packets and so it can be used for transmitting relatively small-sized packets, e.g., request, management, signaling or small data packets).

Figure 5:
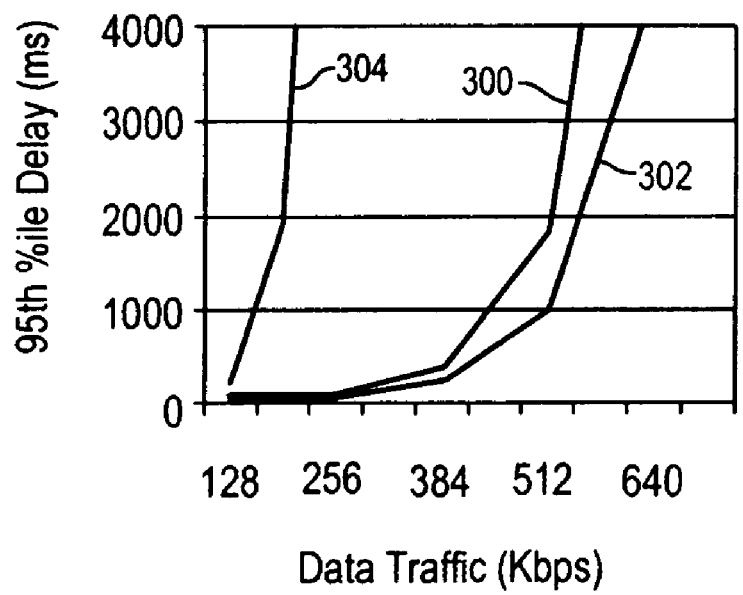
FIG. 5 is a graphical depiction of data packet delay versus data traffic level for map interval arrangements in accordance with the present invention.

As shown in FIG. 5, significantly higher data traffic rates can be supported using soft partitions compared to hard partitions in the direction from the data+signaling interval to the voice interval. As can be seen, a random UG packing curve 300 and a pack UGs away from data-close holes curve 302 show data traffic rates that are much improved over a rate indicated by a hard partition curve 304. Packing voice UGs away from data and closing holes 302 gives somewhat better performance compared to random packing 300.

Referring again to FIGS. 2 and 2A, in a further aspect of the invention, within each map interval 200, the management and primary request intervals 202, 204 form a single contiguous interval referred to as the MR interval. This arrangement reduces the fragmentation of the data+signaling interval 206 and the holes in the voice interval 208. It is understood that a fragmented data+signaling interval can waste bandwidth if available bandwidth fragments are smaller than the data/signaling packet size (in the absence of DOCSIS 1.1 fragmentation feature). Fragmentation of the data/signaling interval can also reduce transmission efficiency due to the increased overhead of fragmentation (in the presence of DOCSIS 1.1 fragmentation feature). As is known to one of ordinary skill in the art, the DOCSIS fragmentation features enable a packet to be broken up into multiple smaller packets in a cable modem and re-combined at the CMTS.

In an exemplary embodiment, within each map interval 200, all the voice unsolicited grants (UG) form a single (or almost single) contiguous interval referred to as the UG interval within the voice region 208 so as to maximize the size of the data+signaling interval. In one embodiment, the UG interval can be located adjacent to the request/management intervals 202, 204. Alternatively, the UGs are placed at an opposite end of the map interval 200 (FIG. 4). Both cases provide a maximized contiguous data+signaling interval (the interval 206 plus a single adjoining hole left over by the voice UGs). By consolidating the UGs, fragmentation of the data+signaling interval is reduced so as to increase transmission efficiency.

In one particular embodiment, the system determines whether there already exists a contiguous UG interval. Any new unsolicited grant is placed adjacent to the existing UG interval to form a single bigger UG interval, so long as the predetermined upper limit of the voice interval is not exceeded. If the upper limit of the voice interval would be exceeded by adding a new UG, the new request for unsolicited grant is refused. Selection of the upper limit of the voice interval can depend upon the amount of expected voice and data traffic, the blocking requirement for voice calls, and the delay and throughput requirements of data packets. A typical example of the upper limit can be about 70% of the total bandwidth available to voice, data and signaling traffic.

In another aspect of the invention, if a hole is formed upon the removal of an unsolicited grant UG, then there are two scenarios. In a first scenario, all unsolicited grants on one side of the formed hole are shifted to close the hole to form a single contiguous voice interval so as to minimize fragmentation of the data+signaling interval. While this may introduce some jitter in voice calls, the amount of jitter is generally acceptable. For example, for G.711 encoded voice calls using payload header suppression over a 2.56 Mbps channel, the amount of jitter is about 0.425 ms. Tolerable delay jitter is typically around 2 ms.

In the second scenario, the hole is allowed to remain and the system attempts to fill the hole with management, request, signaling, and/or data packets. The second scenario does not introduce any jitter, but does introduce some fragmentation of the data+signaling interval (the interval 206 plus all holes left over by the voice UGs). However, any degradation in data throughput due to this fragmentation is relatively small.

In another aspect of the invention, voice unsolicited grants are limited to a predetermined fraction $\alpha$, where $\alpha<1$, of the total bandwidth available to voice, data and signaling, i.e., all the bandwidth except for that used for the request and management intervals 202, 204. This ensures that data and signaling traffic always has some bandwidth available. The size of $\alpha$ is determined based on the number of voice and data subscribers to be supported and their blocking grade of service requirement. An exemplary value of $\alpha$ can be about 0.7.

Note that as voice calls come and go, the total length of the UG interval fluctuates. However, bandwidth, other than that used by the UG and MR intervals, is available to data and signaling as a single contiguous block. Also note that a $(1-\alpha)$ portion of the overall bandwidth (except for the bandwidth used by request and management regions 202, 204) is available to data and signaling traffic.

In an exemplary embodiment, separate SIDs (Service Flow IDs) are used for data and signaling so that the data and signaling packets queue separately. This will ensure that signaling packets would not have to be excessively delayed during an occasional burst of large data packets. In one particular embodiment, priority is given to signaling over data. If both data and signaling packets are in a grant-pending status then the CMTS 104 (FIG. 1) uses priority in allocating grants to signaling packets ahead of data packets.

If at any given instant, the total available bandwidth is more than the sum of the bandwidth needs for the primary request 202, management 204, voice (the unsolicited grants within interval 208) and data+signaling, then all the excess bandwidth is used to form a secondary request interval that expands the overall request interval. Expanding the overall request interval reduces contention and decreases the amount of time between requesting a data grant and actually getting it. The request packets are relatively short, e.g., one or two mini-slots, so that fragmentation is negligible. Therefore, the secondary request interval need not form a contiguous block or be adjacent to the original request interval. Rather, wherever an unused gap is available, it can be filled with request packets.

Figure 6:
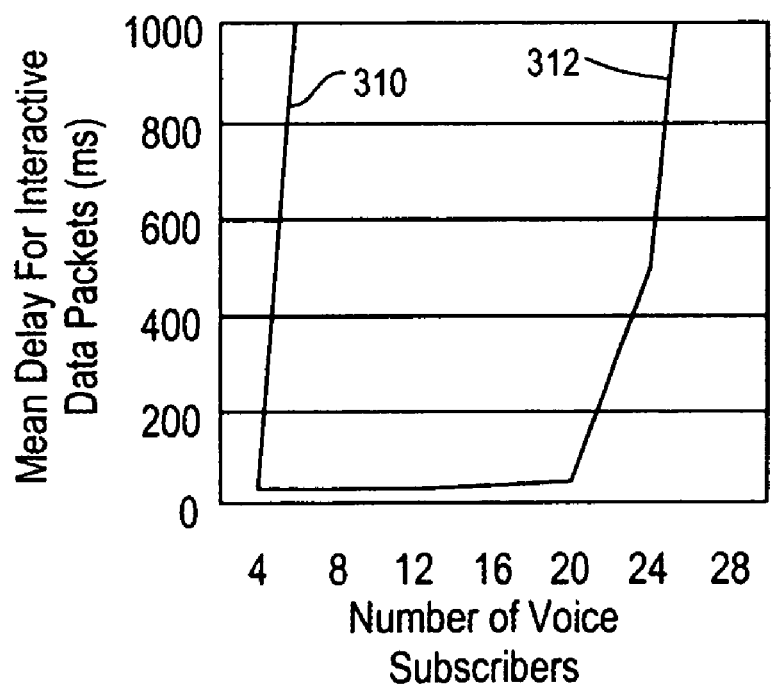
FIG. 6 is a graphical depiction of a mean data packet delay versus number of voice subscribers with random UG assignment for varying maximum transfer units for a network having bandwidth sharing in accordance with the present invention.
Figure 7:
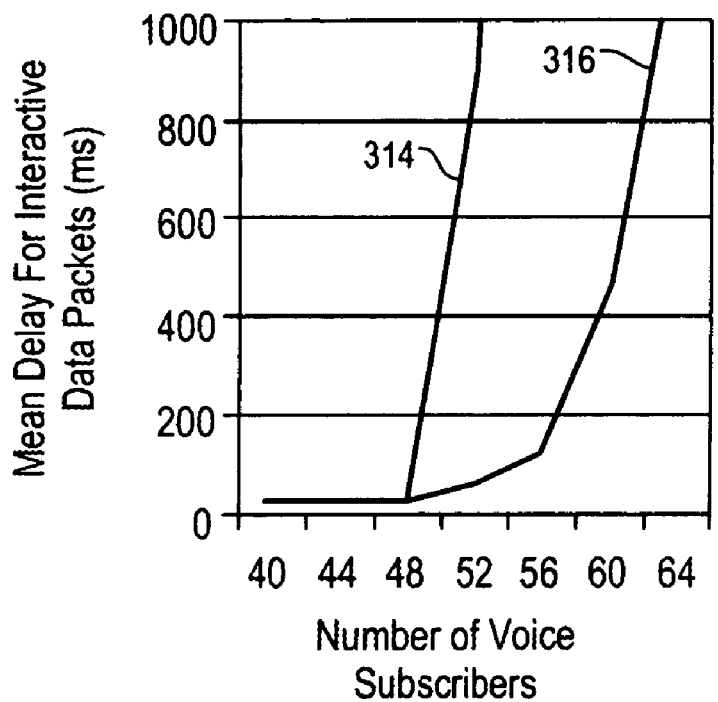
FIG. 7 is a graphical depiction of a mean data packet delay versus number of voice subscribers with UGs packed away from data for varying maximum transfer units for a network having bandwidth sharing in accordance with the present invention.

FIGS. 6 and 7 show the effect of maximum allowed data packet size or maximum transfer unit (MTU) for dynamic UG packing schemes in the absence of the DOCSIS fragmentation feature in accordance with the present invention. For random assignment of UGs within the voice interval, FIG. 6 shows the relationship between mean delay for data packets versus the number of voice subscribers for a first curve 310 having an MTU of 1500 bytes and a second curve having an MTU of 500 bytes. As can be seen, the MTU size impacts the number of voice subscribers that can be supported.

Similarly, FIG. 7 shows the impact of MTU size on the number of supportable voice subscribers for UGs packed away from data with holes closed arrangement with the fragmentation feature not being implemented. A first curve 314 corresponds to an MTU size of 1500 bytes and a second curve 316 corresponds to an MTU size of 500 bytes. Comparing FIGS. 6 and 7 it can be seen that in the absence of the fragmentation feature the packing away from data with holes closed arrangement (FIG. 7) supports many more voice subscribers and hence is significantly better than the random packing arrangement (FIG. 6).

Figure 8:
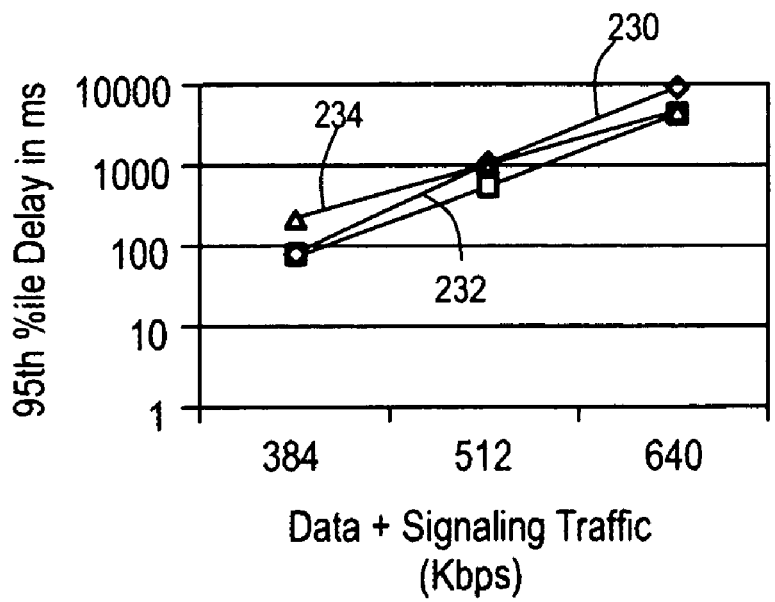
FIG. 8 is a graphical depiction of 95th percentile signaling packet delay versus data-plus-signaling traffic level for signaling and data packets having the same priority and using the same Service ID (SID))
Figure 9:
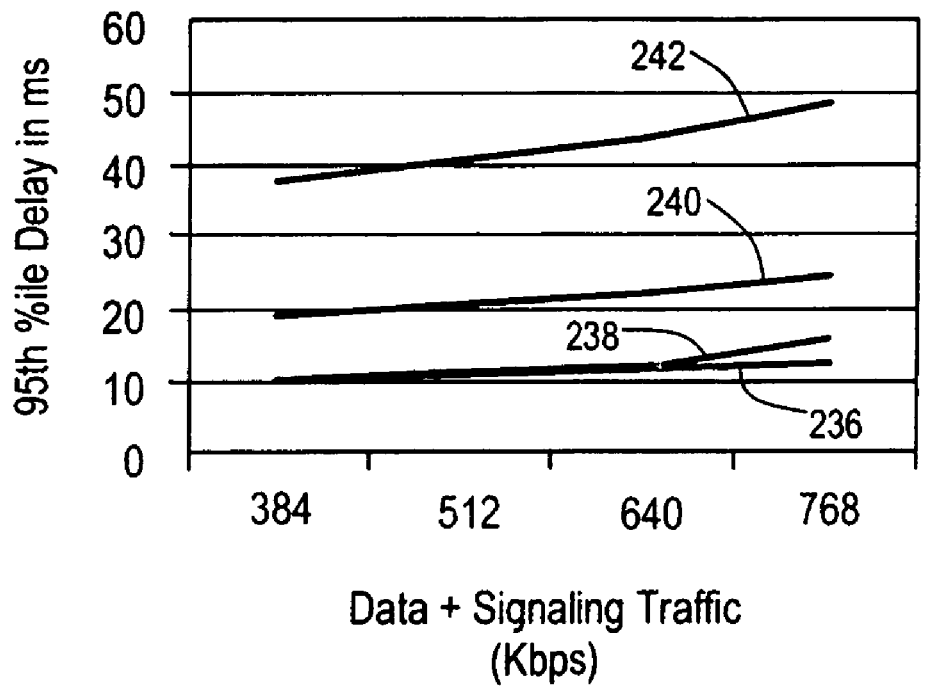
FIG. 9 is a graphical depiction of 95th percentile signaling packet delay versus data-plus-signaling traffic level for signaling and data packets using different SIDs and signaling packets having higher priority over data packets.

As shown in FIG. 8, if signaling and data packets have the same priority and use the same SID then signaling packet delays can be in the range of hundreds of milliseconds to seconds, which may be unacceptably high. Plots are shown for map intervals of 2.5 ms 230, 5 ms 232, and 10 ms 234. However, as shown in FIG. 9, if signaling uses a separate SID and is given priority over data, then the delay decreases to a few tens of milliseconds, which is orders of magnitude smaller than that in FIG. 8, and is typically acceptable. Plots are shown for map intervals of 2 ms 236, 2.5 ms 238, 5 ms 240, and 10 ms 242. Since signaling traffic is small compared to data traffic, this prioritization does not have any significant negative impact on data traffic performance.

Figure 10:
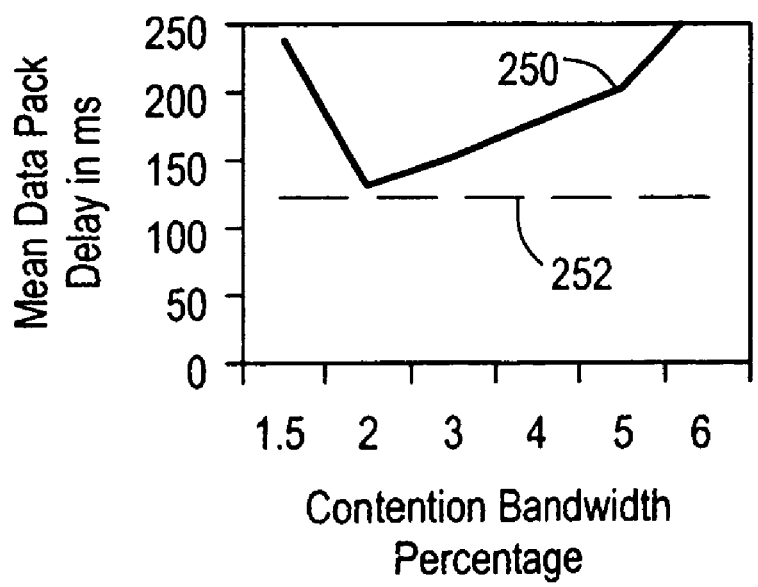
FIG. 10 is a graphical depiction of mean packet delay versus contention bandwidth percentage with and without a secondary request interval in accordance with the present invention.

FIG. 10 shows the impact of using a secondary request region when idle bandwidth is available. The mean data packet delay versus contention bandwidth is shown for a conventional static scheme plot 250 and a dynamic scheme plot 252 in which a secondary request region is used whenever idle bandwidth is available in accordance with the present invention. As can be seen, the dynamic bandwidth scheme using a secondary request region significantly reduces the delay for data packets compared to the static scheme.

It is understood that while the invention is shown and described in conjunction with cable modems, it is applicable to communication systems in general which have limited bandwidth including DSL and Wireless networks. It is further understood that certain terms and features, such as map interval and the like, should be broadly construed to cover a variety of implementations within the scope of the present invention.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety. In the claims it is to be understood that the term "voice" is used generically to imply any real-time traffic stream with tight delay jitter requirement.

What is claimed is:

1. A method for sharing channel bandwidth, comprising:
   generating a map interval defining channel transmissions for a period of time;
   flexibly partitioning the map interval into a request interval, a management interval, a data+signaling interval, and a voice interval so as to optimize use of the channel bandwidth, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and
   further including allowing a soft partition among voice and data in which data is allowed to utilize unused bandwidth in voice interval with lower priority.

2. A method for sharing channel bandwidth, comprising:
   generating a map interval defining channel transmissions for a period of time;
   flexibly partitioning the map interval into a request interval, a management interval, a data+signaling interval, and a voice interval so as to optimize use of the channel bandwidth; and
   further including placing a request interval, management interval and voice unsolicited grants adjacent to each other at one end of the map interval so that a single contiguous interval is available for data+signaling, a plurality of unsolicited grants for said voice interval tacked away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

3. A method for sharing channel bandwidth, comprising:
   generating a map interval defining channel transmissions for a period of time;
   flexibly partitioning the map interval into a request interval, a management interval, a data+signaling interval, and a voice interval so as to optimize use of the channel bandwidth; and
   further including placing a request+management interval and voice unsolicited grants on opposite ends of the map interval so that a single contiguous interval is available for data+signaling, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

4. A method for sharing channel bandwidth, comprising:
   generating a map interval defining channel transmissions for a period of time;
   flexibly partitioning the map interval into a request interval, a management interval, a data+signaling interval, and a voice interval so as to optimize use of the channel bandwidth;
   further including placing voice unsolicited grants (UGs) contiguously within the voice interval,
   a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

5. A method for sharing channel bandwidth, comprising:
   generating a map interval defining channel transmissions for a period of time;
   flexibly partitioning the map interval into a request interval, a management interval, a data+signaling interval, and a voice interval so as to optimize use of the channel bandwidth;
   further including placing voice unsolicited grants (UGs) contiguously within the voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

6. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth;
further including placing voice unsolicited grants (UGs) contiguously within the voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

7. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth; and
further including placing unsolicited grants within the voice interval until a predetermined fraction of total bandwidth available for voice, data, and signaling is reached, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval.

8. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and
further including maximizing contiguousness of the data+signaling interval.

9. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and
further including assigning a higher priority to signaling packets than data packets within the data+signaling interval.

10. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval;
further including assigning a higher priority to signaling packets than data packets within the data+signaling interval; and
further including assigning unique service flow identifications to each signaling and data stream.

11. A method for sharing channel bandwidth, comprising:
generating a map interval defining channel transmissions for a period of time;
flexibly partitioning the map interval into a request interval, a management interval, a data+signaling interval, and a voice interval so as to optimize use of the channel bandwidth, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and
further including generating a secondary request interval within the map interval if bandwidth is available.

12. A method for sharing upstream channel bandwidth in a Data Over Cable Service Interface Specification (DOCSIS) system, comprising:
transmitting map intervals from a cable modem termination system on a downstream channel to a plurality of cable modems, wherein the map intervals define upstream traffic for the plurality of cable modems for a period of time in the future; and
flexibly partitioning the map intervals into a plurality of sub intervals based upon bandwidth requirements of the sub intervals;
further including partitioning the map intervals into at least a request interval, a management interval, a data+signaling interval, and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval;
further including placing the management interval and the request interval together to form a contiguous interval.

13. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals;

further including partitioning the map intervals into at least a request interval, a management interval, a data+signaling interval, and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval;

further including placing the management interval and the request interval together to form a contiguous interval.

14. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals, the sub intervals comprising at least a data+signaling interval and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and further placing unsolicited grants within the voice interval up to a predetermined maximum bandwidth.

15. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals, the sub intervals comprising at least a data+signaling interval and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and further including minimizing fragmentation of the data+signaling interval.

16. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals, said subintervals comprising a data+signaling interval and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and further including assigning separate service flow identifications to data and signaling streams.

17. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals, said subintervals comprising a data+signaling interval and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and further including assigning a higher priority to signing packets than data packets.

18. A method for sharing upstream channel bandwidth in a Data Over Cable Service Interface Specification (DOCSIS) system, comprising:

transmitting map intervals from a cable modem termination system on a downstream channel to a plurality of cable modems, wherein the map intervals define upstream traffic for the plurality of cable modems for a period of time in the future; and flexibly partitioning the map intervals into a plurality of sub intervals based upon bandwidth requirements of the sub intervals, said subintervals comprising a data+signaling interval and a voice interval, a plurality of unsolicited grants for said voice interval packed away from the data+signaling interval in order to form a single hole adjoining the data+signaling interval, wherein when a voice call termination leaves a gap among the plurality of unsolicited grants, the gap is closed by a movement of one or more of the plurality of unsolicited grants away from the data+signaling interval; and further including forming a further request interval when bandwidth is available.

* * * * *